Patented Jan. 5, 1932

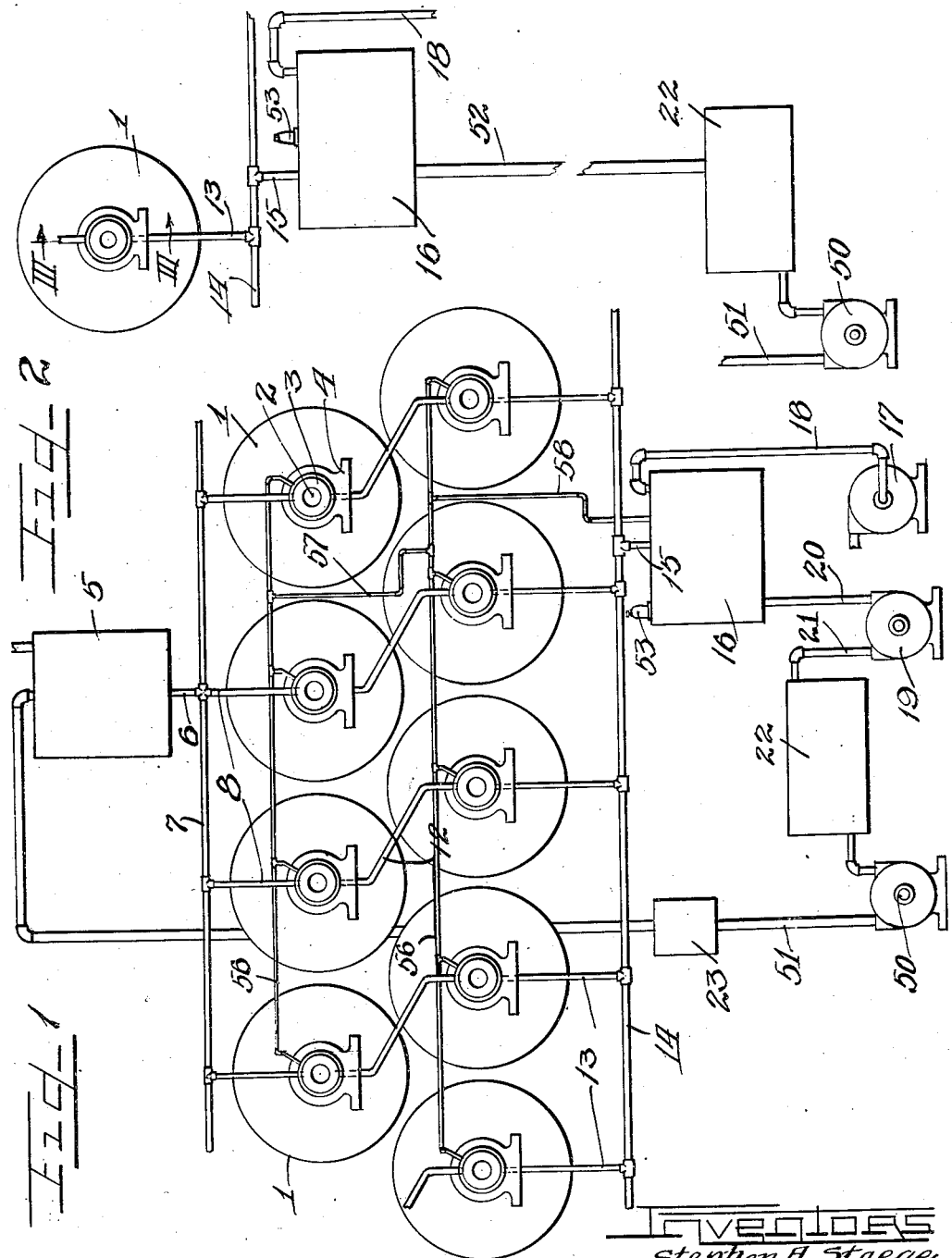

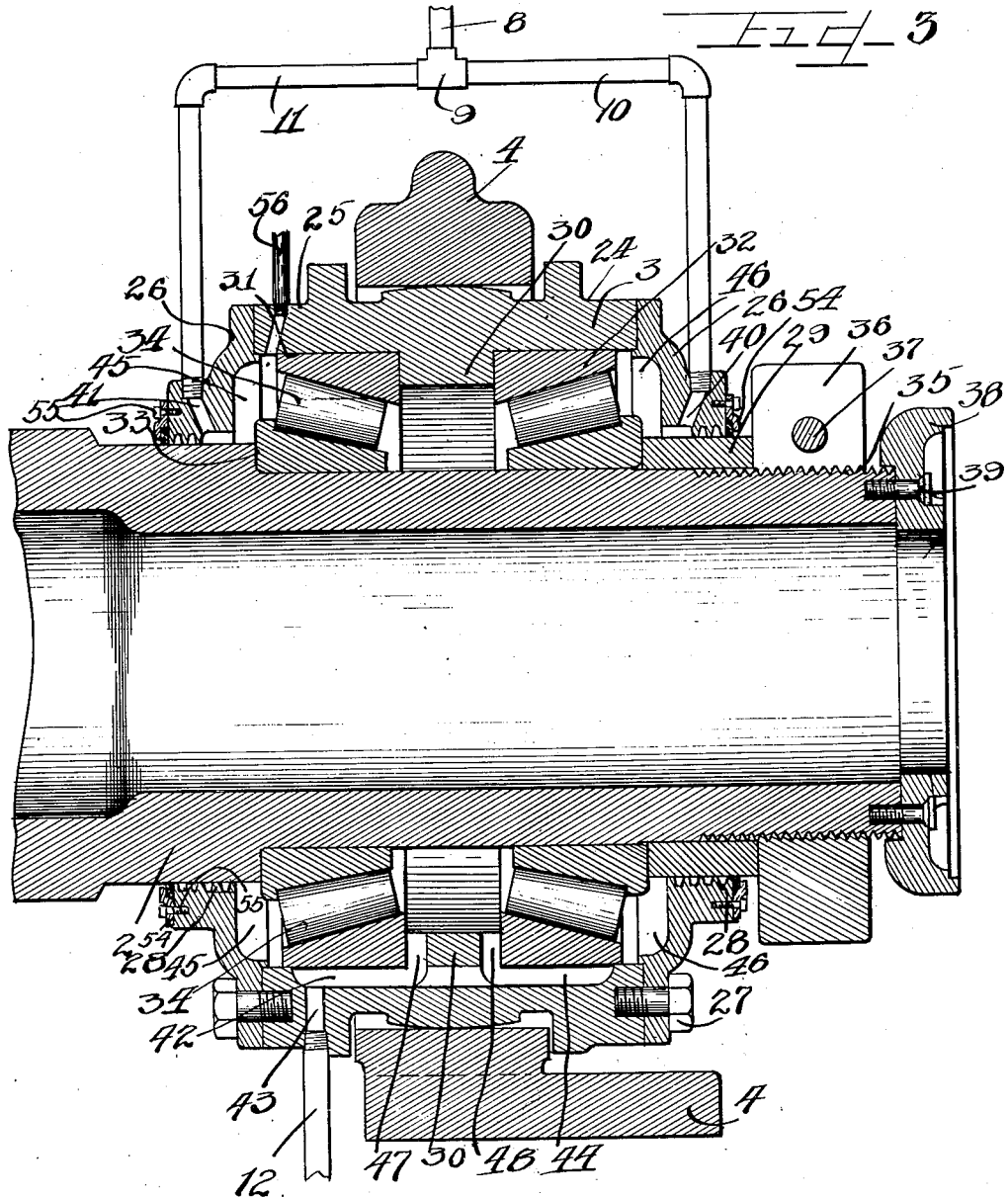

1,839,508

UNITED STATES PATENT OFFICE

STEPHEN A. STAEGE, OF PITTSBURGH, PENNSYLVANIA, AND EARL E. BERRY, OF BELOIT, WISCONSIN; SAID BERRY ASSIGNOR TO BELOIT IRON WORKS, OF BELOIT, WISCONSIN, A CORPORATION OF WISCONSIN

LUBRICATING SYSTEM FOR DRIERS

Application filed May 19, 1927. Serial No. 192,700.

This invention relates to a lubricating system for driers and more particularly to a vacuum lubricating system for use in connection with anti-friction bearings on paper machine driers.

Owing to the fact that the paper machine drier journals are necessarily raised to a high temperature by the steam passing through them and by heat conduction from the cylinders themselves, it has been difficult heretofore to properly lubricate and cool the bearings for the journals. The use of roller or ball bearings for drying cylinders presents obvious advantages in reducing the friction, and consequently the starting torque and running load and in permitting higher speeds, but the difficulties attendant upon properly lubricating the roller or ball bearings to prevent overheating and resulting carbonization of the lubricant and wear on the bearings have partially outweighed these advantages.

Were it possible to circulate a sufficient quantity of oil through the bearings so as to carry away the heat, thus preventing the temperature from rising high enough to carbonize the oil and also with sufficient flow of oil to carry away quickly any carbon that might be developed, then the use of anti-friction bearings would become practicable. It has seemed in the past to be impossible, however, to circulate such quantities of oil through the bearings, inasmuch as excessive leakage of oil is sure to take place on account of the very low viscosity and thinness of the oil due to the high existing temperatures, with the result that the oil leaks out between the shaft and the packing gland onto the outside of the machine, drips on the floor, collects dust, gets on the paper and makes all kinds of trouble.

In order to avoid this difficulty and make possible the circulation of large quantities of oil so as to keep the bearings relatively cool and carry away any carbon that might by any chance be developed, the vacuum system is proposed.

By means of the vacuum system, a subatmospheric pressure may be maintained within the bearing housing at all times, so that there will tend to be an infiltration of air from the outside toward the inside of the bearing, thereby effectively preventing the leakage of oil from the inside of the bearing to the outside. This affords the solution of the troublesome problem which has confronted the attempt to use anti-friction bearings heretofore.

A subatmospheric pressure in the bearing housing, which might be anything from perhaps 1″ of vacuum up to any desired amount of vacuum, will effectively prevent leakage of oil from the bearings, as at every opening no matter how small, anything that can move or flow like air or oil will be flowing toward the point of lowest pressure, which is inside of the bearing.

It is therefore an object of this invention to provide anti-friction bearings for paper machine drying cylinders and to provide a vacuum lubricating system for said bearings wherein a continuous and thorough circulation of relatively large quantities of lubricant through the bearings is made possible by means of the vacuum, thus preventing overheating of the lubricant and bearing parts.

It is a further object of this invention to provide a vacuum circulation lubricating system for the bearings of paper machine driers in order to prevent seepage of the lubricant to the outside of the bearings with consequent loss of lubricant, and accumulation of dirt on the outside of the bearings and to provide sealing means to prevent dust, dirt and the like from being drawn into the bearing housings.

It is a further object of this invention to provide an improved type of roller bearing for paper machine drying cylinders and a lubricating system for said bearings wherein the oil is filtered and cooled during its circulation.

It is a further object of this invention to provide means for adjusting the roller bearings to compensate for the expansion of the journals due to the heat produced by the steam circulating through the journals.

Other and further important objects of this invention will be apparent from the disclosures in the specification and the accompanying drawings.

This invention (in a preferred form) is illustrated in the drawings and hereinafter more fully described.

On the drawings:

Figure 1 is a diagrammatic rear elevational view of a portion of a paper machine drier unit, illustrating the lubricating system of our invention.

Figure 2 is a fragmentary broken elevational view of a modified lubricating system.

Figure 3 is an enlarged sectional view taken on line III—III of Figure 2 with parts in elevation.

As shown on the drawings:

The reference numeral 1 indicates a plurality of drying cylinders which are arranged, as commonly, in upper and lower horizontal tiers. It will be understood, however, that our invention is equally applicable to drier installations in which the driers are arranged in vertical tiers. Each of said drying cylinders 1 is provided at its rear end with a hollow extended journal 2, in accordance with standard construction, for the introduction of steam to the cylinder. Said journals 2 are each adapted to be mounted in a bearing 3, suitably supported in a ring support or block 4. The lubricating system shown in Figure 1 for the bearings 3 comprises an elevated open supply tank 5 having a pipe 6 leading from the bottom thereof to an upper horizontal header 7. One such supply tank 5 preferably serves the entire drier unit. Branch pipes 8 lead from said header 7 to each of the bearings 3 on the front and rear ends of the upper drier drums, said pipes 8 being further branched, as at 9, (Figure 3) into pipes 10 and 11 leading to the front and rear respectively of each upper bearing 3. Other pipes 12 are connected from the bottom portion of each of said upper bearings 3 into the top of each of the bearings of the next adjacent lower drying drums. After passing through said lower bearings, the lubricant is removed through pipes 13 connected to the bottom of said bearings into a lower header 14. Said lower header 14 is connected by means of a pipe 15 to a receiving tank 16 located beneath the driers. Said receiving tank 16 is kept under vacuum, as by means of vacuum pump 17, connected to said tank by a vacuum line 18 leading into the top thereof. The pipes 13, header 14, and pipe 15 are all of sufficient size to carry off the lubricant from the bearings as fast as it is supplied to said bearings and may also be of sufficient size to take care of any air that may leak into the system through the bearings and elsewhere. Preferably, however, separate suction lines 56 are connected to the upper lubricant free portion of each of the bearing housings to remove air and vapor but not oil. Said lines 56 may be of relatively small diameter for this purpose. As illustrated, the suction lines 56 comprise two horizontal sections of piping serving the upper and lower tiers of driers respectively, and connected by piping 57. A pipe 58 connects both sections of piping 56 to the top of the receiving tank 16.

It will thus be apparent that a positive vacuum within each bearing housing will be assured regardless of the amount of oil flowing and inasmuch as substantially the same vacuum is applied to the bearing housing as to the receiving tank, the differential in pressure between the bearing and the receiving tank is exactly or substantially the same as though no vacuum were applied at all and the head which creates the flow of lubricant through the bearing housings 3 to the receiving tank 16 is equal to the difference in level between the lubricant supply tank 5 and the receiving tank 16 less friction in the piping. Consequently a very large volume of lubricant can be circulated through the bearings continuously.

A circulating pump 19 draws the lubricant through a pipe 20 from the bottom of said tank 16 and forces said lubricant through a discharge line 21 into a filter or purifier 22. Another pump 50 draws the lubricant from said filter 22 and forces it through a line 51, in which is positioned a cooler 23, back to the supply tank 5.

According to this system, a rapid and voluminous circulation of the lubricant, or oil, is maintained through the bearings. It will be noted that the filtered and cooled oil passes first through each of the upper bearings separately, and then through each of the lower bearings, adjacent upper and lower bearings being arranged in tandem. In this way the lubricant, or oil, is constantly delivered in cooled and filtered condition to the bearings, whereby overheating of the oil and wear on the bearings is prevented.

In Figure 2, there is shown a modified lubricating system in which sufficient hydraulic head is provided to permit the system to be maintained under a vacuum and still effect a gravitational flow of oil from the sump or receiving tank 16 to the filter 22. This head is provided by a sufficient length of piping 52 leading from the bottom of the tank 16 to the filter 22. Said tank 16 is connected at the top to a source of vacuum by means of the pipe 18. A vacuum relief valve 53 is provided for the tank 16 to prevent excessive vacuum. According to this modified system, the pump 19 is rendered unnecessary. Also, the piping 13, 14 and 15 for circulating the lubricant is of sufficient size to take care not only of the flow of lubricant but also of air and vapor drawn into the system, thus eliminating the necessity for separate suction lines such as line 56 in Figure 1.

The construction of the individual bearings is best shown in Figure 3. Said bearings each comprise a bearing housing 24 formed of a ring 25 and end flanges 26 secured to said ring by bolts 27. Said end flanges 26 are provided with oil seals 28 engaging the hollow shaft 2 and a spacing ring 29 at the inner and outer ends of said bearings respectively.

A sealing ring gland 54 is adapted to be secured to each of said end flanges 26 by means of screws 55 to prevent dust and dirt from being drawn into the bearing housing. Said housing ring 25 is provided with an inner annular shoulder 30 against which abut bearing races 31 and 32. Said bearing races 31 are adapted to be retained between said shoulder 30 and a shoulder 33 formed on the hollow shaft 2. Similarly, said bearing races 32 are adapted to be retained between the shoulder 30 and the spacing ring 29. Each of said bearing races 31 and 32 is provided with a plurality of tapered rollers 34 and is of standard construction. The end of said hollow journal 2 is threaded, as at 35, to receive a threaded retaining ring 36, said ring 36 being split and held by means of a bolt 37. A hollow cap 38 is secured to the end of said journal 2 by means of bolts 39 to form a guard therefor.

The oil conducting pipes 10 and 11, as shown, are threaded respectively into passages 40 and 41 provided in the end flanges 26 of the bearing housing 24. The oil accordingly enters the bearing housing at each end and effectively seals the housing against entrance of air from the outside through the sealing glands 54 and the oil seals 28. Said passages 40 and 41 communicate with grooves or recesses 45 and 46 formed in the interior of said end flanges 26. In the lower portion of the bearing housing 24, central, longitudinal and communicating grooves 42 and 44 formed on the inside of the ring 25 and extending through the shoulder 30 provide a drain into a passage 43, which extends through the bottom of the ring 25. The grooves 42 and 44 do not communicate directly with the end recesses 45 and 46.

Consequently the lubricant, or oil, which is delivered through the top of each bearing into end recesses 45 and 46, must pass completely through the bearing races 31 and 32 in order to find outlet through the drain grooves 42 and 44, the annular shoulder 30 being recessed as at 47 and 48 for this purpose. This results in very effective and thorough lubrication of the bearings. The rapid circulation and outside cooling of the oil prevents it from being broken down or carbonized, by the heat of the steam heated journal. The pipe 12, which is threaded into the passage 43, conducts the oil into the lower bearings as above described.

It will be appreciated that the construction of bearing housing described permits the bearings to be adjusted to compensate for the expansion of the drier journal. When the bearing housing is originally assembled the bearings are allowed considerable play by lightly adjusting the pressure of the spacing ring 29 against the bearing race 32. This is accomplished by loosely screwing the retaining ring 36 against said spacing ring 29. The bearings will then automatically adjust themselves when the driers are started up, owing to their taper. The adjustment may subsequently be varied by tightening or loosening the retaining ring 36.

While the invention has been described in connection with paper machine driers, it will be understood that the principles of the invention may find wide and varied use on other types of machines and in connection with other types of anti-friction bearings or even plain bearings. In either case, the use of vacuum creates conditions that make possible a large flow of oil without detrimental results, namely, without causing leakage of oil from the bearings.

We are aware that many changes may be made, and numerous details of construction may be varied through a wide range without departing from the principles of this invention, and we therefore do not purpose limiting the patent granted hereon, otherwise than necessitated by the prior art.

We claim as our invention:

A journal bearing for a paper machine drier comprising a housing having flanged ends, ball races in said housing spaced from the ends of said housing and each other to provide a central chamber and end chambers in said housing, lubricant inlet passages in the upper part of said housing ends leading to said end chambers, the lower part of said housing having a longitudinal groove directly connected to said central chamber and thereby and through the agency of the space between said ball races with said end chambers, a lubricant outlet connected with said longitudinal groove, means for causing a gravity flow of lubricant into said lubricant inlet passages through said ball races to said longitudinal groove and out said lubricant outlet and an additional passage in the upper part of said housing having means connected thereto for evacuating said housing to prevent a flow of lubricant from the inner to the outer side of said housing.

In testimony whereof we have hereunto subscribed our names.

STEPHEN A. STAEGE.
EARL E. BERRY.